United States Patent [19]

DeTrano et al.

[11] Patent Number: 5,248,722
[45] Date of Patent: Sep. 28, 1993

[54] TIRE TREAD COMPOSITION

[75] Inventors: Mario N. DeTrano, Massillon; Shingo Futamura, Wadsworth; Mark L. Stayer, Jr., Suffield; William L. Hergenrother, Akron, all of Ohio

[73] Assignee: Bridgestone Corporation, Tokyo, Japan

[21] Appl. No.: 889,945

[22] Filed: Jun. 2, 1992

[51] Int. Cl.$^5$ ................................................ C08K 3/04
[52] U.S. Cl. ...................................... 524/496; 524/495
[58] Field of Search ............................... 524/495, 496

[56] References Cited

U.S. PATENT DOCUMENTS

| | | | |
|---|---|---|---|
| 3,135,716 | 6/1964 | Uraneck et al. | |
| 3,914,148 | 10/1975 | Aboytes | 525/343 |
| 4,015,061 | 3/1977 | Schulz et al. | 525/342 |
| 4,075,140 | 2/1978 | Hunt | 524/495 |
| 4,075,157 | 2/1978 | Johnson | 524/496 |
| 4,555,548 | 11/1985 | Ueda et al. | 525/237 |
| 4,616,069 | 10/1986 | Watanabe et al. | 525/333.2 |
| 4,820,751 | 4/1989 | Takeshita et al. | 524/495 |
| 4,980,541 | 12/1990 | Shafe et al. | 338/22 R |
| 5,066,729 | 11/1991 | Stayer, Jr. et al. | 525/333.2 |
| 5,109,907 | 5/1992 | Stayer, Jr. et al. | 525/315 |

FOREIGN PATENT DOCUMENTS

WO91/10618 7/1991 World Int. Prop. O. .
WO91/13944 9/1991 World Int. Prop. O. .

OTHER PUBLICATIONS

*Anionic Functional Initiators 1: 3–Dimethylaminopropyl-lithium as an Initiator for the Synthesis of Bi-and Difunctional Polybutadienes*, M. J. Stewart, N. Shepherd, and D. M. Service, British Polymer Journal, vol. 22, 319–325 (1990).

*Anionic Polymerization Initiated by Diethylamide in Organic Solvents. I. The Use of Lithium Diethylamide as a Polymerization Catalyst and the Effect of Solvent Type on the Polymerization of Isoprene and Styrene*, A. C. Angood, S. A. Hurley, and P. J. T. Tait, Journal of Polymer Science: Polymer Chemistry Edition, vol. 11, 2777–2791 (1973).

"Anionic Polymerization", J. E. McGrath, Editor, American Chemical Society Symposium Series 166 (1981).

*Primary Examiner*—Paul R. Michl
*Assistant Examiner*—Olga Asinovsky
*Attorney, Agent, or Firm*—Daniel N. Hall

[57] ABSTRACT

A composition utilizing terminally functionalized diene polymers or diene-vinyl substituted aromatic copolymers and oxidized carbon black particulates dispersed therein has been found to provide reduced hysteresis properties and is particularly suited for use as rubber having reduced rolling resistance or hysteresis.

The polymers and copolymers are preferably terminally functionalized with a compound having a nitrogen which acts as a Lewis base when bonded to the polymer. The oxidized carbon black is characterized by a relatively high acid content, with the acid sites of the carbon black interacting with the Lewis base sites on the polymer terminals to increase the carbon-polymer affinity.

24 Claims, No Drawings

TIRE TREAD COMPOSITION

FIELD OF THE INVENTION

The invention relates to an elastomeric polymer composition which is adaptable for use in low hysteresis rubber products, more particularly, to an elastomeric composition utilizing oxidized carbon black particulates dispersed in a terminally functionalized polymer.

BACKGROUND OF THE INVENTION

In recent years, those active in the tire industry have greatly increased their emphasis on the development of tires having both reduced rolling resistance and good wet traction properties. As is well known, that portion of the tire which exerts the greatest influence on rolling resistance and traction is the tread or tread rubber portion. Low rolling resistance is desirable from a fuel consumption standpoint while good wet traction is desirable from a performance standpoint. However, as a general rule, these properties have been found to conflict with each other. Thus, a reduction in rolling resistance generally leads to an almost directionally proportional reduction in wet traction while an increase in wet traction generally leads to an almost directionally proportional increase in rolling resistance.

The prior art has proposed a number of approaches to the solution of this problem. Such approaches have generally involved modifying the properties of the elastomer or elastomer composition utilized to form the tire tread in order to achieve the best possible balance between rolling resistance and traction. The approaches involving modification of the elastomer have generally been based on improving the interaction between the elastomer and the carbon black used in compounding the elastomer to prepare the tire tread composition. This had the effect of reducing the hysteresis of the tire tread composition which in turn results in low rolling resistance.

U.S. Pat. No. 3,135,716 to Uraneck et al teaches a process for making a terminally reactive polymer of conjugated diene monomers and, optionally, aryl substituted olefin monomers using an organo polylithium initiator. The terminal lithium atoms can be displaced by various compounds to form other terminally functionalized polymers.

U.S. Pat. No. 4,555,548 to Ueda et al discloses a polymer composition having benzophenone derivatives at the polymer terminals to improve rebound tread rubber compositions.

U.S. Pat. No. 4,616,069 to Watanabe et al teaches a process for making diene polymer rubber having alkali metal and/or alkaline earth metal terminals which can be reacted with aromatic or aliphatic amino organic compounds to produce a terminally functionalized polymer.

U.S. Pat. No. 4,015, 061 to Schulz et al discloses a N,N-bis(trialkylsilyl) amino-terminated polymer prepared by treating p-lithio-N,N-bis(trialkylsilyl) aryl amine with a diene monomer, which is converted to a mono- or di- primary aryl amine-ended diene polymer by direct acid hydrolysis.

*Anionic Functional Initiators* 1: *3-Dimethylaminopropyllithium as an Initiator for the Synthesis of Bi- and Difunctional Polybutadienes*, M. J. Stewart, N. Shepherd, and D. M. Service, British Polymer Journal, Vol. 22, 319-325 (1990), discloses the use of 3-dimethylaminopropyllithium as an anionic initiator for the polymerization of butadiene.

*Anionic Polymerization Initiated by Diethylamide in Organic Solvents. I. The Use of Lithium Diethylamide as a Polymerization Catalyst and the Effect of Solvent Type on the Polymerization of Isoprene and Styrene*, A. C. Angood, S. A. Hurley, and P. J. T. Tait, Journal of Polymer Science: Polymer Chemistry Edition, Vol. 11, 2777-2791 (1973), discloses the use of lithium diethylamide as an initiator for the polymerization of isoprene.

"Anionic Polymerization", J. E. McGrath, Editor, American Chemical Society Symposium Series 166 (1981), discloses copolymerization of butadiene and styrene using various lithium-nitrogen-bonded initiators, such as lithium morpholinide, lithium dialkylamide, and lithium piperidinide.

A process for preparing a terminally functionalized polymer obtained by anionic polymerization of a diene monomer or mixture of a diene monomer and a vinyl aromatic hydrocarbon monomer is disclosed in U.S. Pat. No. 5,066,729 to Stayer, Jr. et al. The process comprises reacting the polymer with a compound having the formula:

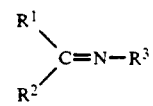

wherein $R^1$ and $R^2$ are selected from the group consisting of H, alkyl, cycloalkyl, aryl, dialkylaminoaryl, aralkyl, and aprotic O, N and S- containing alkyl, cycloalkyl, aryl, or aralkyl groups; wherein $R^3$ is selected from the group consisting of alkyl, cycloalkyl, aryl, dialkylaminoaryl, aralkyl, and aprotic, O, N and S-containing alkyl, cycloalkyl, aryl and aralkyl groups; with the proviso that at least one of the $R^1$, $R^2$ and $R^3$ groups must be a dialkylaminoaryl group and that not all of the $R^1$, $R^2$ and $R^3$ groups can be aryl groups. The resultant terminally functionalized polymer has reduced hysteresis properties and may be utilized to prepare elastomer compositions and tire treads having reduced rolling resistance.

In U.S. Pat. No. 3,914,148 to Aboytes, a carbon black oxidized with a nitrogenous oxidizing acid is utilized in a conventional rubber formulation to provide better elastomer to metal bonding than similar compositions incorporating conventional channel blacks.

The use of nitric acid oxidized carbon black in a conventional rubber compound utilizing unmodified styrene-butadiene rubber to provide a rubber composition having a reduced modulus and an increased scorch time is taught by U.S. Pat. No. 4,075,140 to Hunt.

SUMMARY OF THE INVENTION

The invention relates to an elastomeric composition for use in forming the tread portion of a tire having reduced rolling resistance and good wet traction properties. The composition comprises a terminally functionalized polymer compounded with oxidized carbon black particulates. Generally, a compound containing a reactive functional group is reacted with a polymer prepared by polymerization of at least one diene monomer and, optionally, one or more vinyl substituted aromatic monomers to produce a terminally functionalized polymer. The terminal compounds of the invention are either tin or nitrogen-containing compounds such as aminoaldehydes, aminoketones, aminothioaldehydes, aminothioketones, amides, thioamides, imines or Schiff base compounds, amine substituted benzophenones, amine substituted thiobenzophenones, carbodiimides, carbamides or urea derivatives, aryl amines, dialiphatic amines, N-substituted cyclic amides, N,N,N',N'-tetra substituted and N,N'-disubstituted cyclic ureas, and isocyanates. The oxidized carbon black particulates of the invention are characterized by a relatively high acid content which, upon compounding with the terminally functionalized polymer, enhances the interaction between the polymer and the carbon black. The oxidized carbon black can be blended with ordinary carbon black, and/or the level of oxidation of the carbon black can be selected, to control the degree of interaction between the carbon black and the terminally functionalized polymer.

Significant reduction in hysteresis at 50° C. (low rolling resistance) and yet retention of relatively high hysteresis at 0° C. (enhanced wet traction) can be obtained. Tailor made properties can thus be achieved.

DETAILED DESCRIPTION

The Hysteresis of a rubber compound refers to the difference between the energy applied to deform a rubber compound and the energy released as the rubber compound recovers to its initial undeformed state. More specifically, the term "hysteresis" as used herein, refers to the heat generating properties of an elastomer or rubber composition during cyclic deformation. An art recognized measurement of the hysteresis of an elastomer composition is the tan-δ value of the composition. A low tan-δ value at 50° C. for an elastomeric composition indicates low hysteresis and, consequently, that tires made from such a composition will have lower rolling resistance.

The elastomeric polymer compositions of the invention comprise oxidized carbon black particulates dispersed in a terminally functionalized elastomeric polymer. The compounds used to terminally functionalize the polymers are either tin containing organometallic compounds or nitrogen-containing compounds such as aminoaldehydes, aminoketones, aminothioaldehydes, aminothioketones, amides, thioamides, imines or Schiff base compounds, amine substituted benzophenones, amine substituted thiobenzophenones, carbodiimides, carbamides or urea derivatives, aryl amines, dialiphatic amines, N-substituted cyclic amides, N,N'-disubstituted cyclic ureas, and isocyanates. The carbon black particulates are characterized by a relatively high acid concentration. The functionalized sites at the terminal portion(s) of the polymer molecules interact with the oxidized sites on the carbon black particulates to increase the affinity therebetween, whereby improved hysteresis properties and lower rolling resistances are observed.

The elastomeric polymers of the invention include those polymerized from diene monomers or mixtures of diene monomers and one or more vinyl substituted aromatic monomers.

Conjugated dienes which can be utilized in preparing the terminally functionalized polymers and copolymers have from 4 to 10 carbon atoms and specific examples include 1,3-butadiene, 2-methyl-1,3-butadiene (isoprene), 2,3-dimethyl-1,3-butadiene, 1,3-pentadiene, 1,3-hexadiene and the like as well as mixtures thereof with butadiene and/or isoprene being preferred. Vinyl substituted aromatics which can be utilized in preparing the terminally functionalized copolymers have from 8 to 12 carbon atoms and specific examples include styrene, vinyl toluene, alpha-methyl styrene, para-methyl styrene, t-butyl styrene, and the like. The preferred vinyl aromatic hydrocarbon is styrene.

The terminally functionalized polymer can be prepared in a manner known to the art and to the literature by polymerizing the monomer or monomers in a hydrocarbon solvent in the presence of an anionic initiator. In instances where it is desired to control the 1,2-microstructure of the diene polymer or copolymer and to effect randomization of the copolymer, this can readily be accomplished by including an appropriate polar modifier such as an ether or a tertiary amine in the polymerization mixture.

Anionic initiators which can be utilized in the preparation of the terminally functionalized polymers and copolymers can be any of the organoalkali metal initiators known in the art to be useful for the polymerization of diene polymers and copolymers. The preferred initiators are organolithium initiators, especially the alkyllithium initiators. Suitable organolithium initiators which can be utilized include ethyllithium, n-butyllithium, tetramethylene dilithium, hexyllithium, cyclohexyl lithium, phenyllithium, tolyllithium and the like. A particularly preferred initiator is n-butyllithium.

It is also possible to employ as the anionic initiator an initiator formed by reacting a functionalizing agent with the above-described organolithium initiators. Thus, such initiators can be formed by reacting an organolithium compound with a nitrogen-containing functionalizing agent such as a substituted aldimine, ketimine or secondary amine. For example, an anionic initiator of this type can be formed by reacting a substituted aldimine such as dimethylamino benzylidene methylamine with n-butyllithium.

Hydrocarbon solvents which can be employed in the preparation of the terminally functionalized polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which can be utilized to control the 1,2-microstructure content of the terminally functionalized diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis(2-oxolanyl)methane; 2,2-bis(2-oxolanyl)propane; 1,1-bis(2-oxolanyl)ethane; 2,2-bis(5-methyl-2-oxolanyl) propane and the like and tertiary amine compounds such as triethyl amine, tripropyl amine, tributyl amine, N,N,N',N'-tetramethylethylene diamine (TMEDA), dipiperidino ethane, and the like. The preferred polar modifiers are TMEDA and the oligomeric oxolanyl propanes.

Conjugated dienes and vinyl substituted aromatics utilized to prepare the terminally functionalized polymers of the invention are made from about 100 to 20 percent by weight of one or more conjugated substituted dienes and from about 0 to about 80 percent by weight of a vinyl substituted aromatic with the preferred copolymers being made from 90 to 60 percent by weight of said conjugated diene and from 10 to 40 percent by weight of said vinyl substituted aromatic.

The terminally functionalized polymers generally have 1,2-microstructure contents ranging from about 10 to about 80 percent with the preferred polymers or copolymers having 1,2-microstructure contents of from 25 to 65 percent. The preparation of diene polymers or copolymers having a particular 1,2-microstructure content is dependent on a number of factors including the specific initiator, the type polar modifier, the modifier to initiator ratio and the polymerization temperature. Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerizations", Journal of Polymer Science, Part A-1, Vol. 10, pages 1319-1334 (1972); the disclosures of which are incorporated herein by reference.

One class of terminally functionalized polymers in accordance with the invention can be prepared in accordance with the disclosure of U.S. Pat. No. 5,066,729 to Stayer, Jr. et al, the contents of which are hereby wholly incorporated by reference herein. The polymers are reacted, preferably in the hydrocarbon solvent in which they were prepared, with a substituted imine or Schiff base compound having the formula:

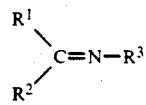

wherein $R^1$ and $R^2$ are selected from H, alkyl, cycloalkyl, aryl, dialkylaminoaryl, aralkyl, and aprotic O, N, and S-containing alkyl, cycloalkyl, aryl, or aralkyl groups; wherein $R^3$ is selected from the group consisting of alkyl, cycloalkyl, aryl, dialkylaminoaryl, aralkyl, and aprotic O, N, and S-containing alkyl, cycloalkyl, aryl and aralkyl groups; with the proviso that at least one of the $R^1$, $R^2$, and $R^3$ groups must be a dialkylaminoaryl group and that not all of the $R^1$, $R^2$, $R^3$ groups can be aryl groups. The alkyl groups in the above formula can independently contain from 1 to 20 carbon atoms with alkyl groups containing from 1 to 8 carbons being preferred.

Particularly, preferred substituted imines for use in preparing the terminally functionalized polymers of the invention are dimethylaminobenzylidene aniline, dimethylaminobenzylidene butylaniline, benzylidene dimethylaminoaniline, dimethylaminobenzylidenedimethylaminoaniline, dimethylaminobenzylidene methoxyaniline, methoxybenzylidene dimethylaminoaniline, dimethylaminobenzylidene dodecylaniline and 2-methylpent-4-en-2-yl methylidene p-dimethylaminoaniline.

The reaction of the polymer in solution with the substituted imine terminating agent can be conducted if desired by simply adding the terminating agent per se to the polymer solution. However, it is generally preferred to add the terminating agent in the form of a solution thereof in an appropriate solvent for ease of handling. The amounts of terminating agent added to the polymer are dependent upon the amounts of live organoalkali metal end groups (e.g. live lithium end groups) present in the polymer and the amounts of terminating agent desired in the finished polymer. It will be noted that the number of moles of live alkali metal end groups in the polymer is presumed to be equivalent to the number of moles of alkali metal groups present in the organoalkali metal initiator utilized to effect polymerization. In general, the amount of terminating agent employed to react with the live alkali metal groups of the polymer herein may range from about stoichiometric, i.e. about 1 mole of terminating agent per mole of live alkali metal end groups, to a large excess of terminating agent. However, from about 1.00 to 1.25 moles of terminating agent per mole of alkali metal end groups is preferred. Generally, the polymer can have one terminating end group or two end groups thereon.

Temperatures employed in reacting the starting polymer which is to be functionalized with the terminating agent may vary considerably and are selected with the basic criteria of preserving the live alkali metal end groups of the polymer for reaction with the terminating agents. Thus, the reaction temperatures may range from about 0° C. to about 100° C. with preferred temperatures ranging from 30° C. to 100° C., and especially preferred temperatures ranging from 50° C. to 80° C. The reaction times may also vary considerably and are in general dependent upon reaction temperatures. Hence, the reaction times may range from about 0.5 to about 24 hours.

Another class of terminally functionalized polymers suitable for use with the invention consists of polymers which are terminated with a compound having a functional nitrogen group such as an amino or amide group.

As disclosed in U.S. Pat. No. 3,135,716 to Uraneck et al, the contents of which are hereby fully incorporated by reference herein, polymers terminated with a compound having a reactive nitrogen can be produced by contacting the monomers previously set forth with an organo polyalkali metal compound which initiates polymerization. The organo radical is incorporated in the polymer chain and the alkali metal is attached terminally at each end of the polymer chain. The organic radical of the organo polyalkali metal compound can be an aliphatic, cycloaliphatic or aromatic radical with specific organo polyalkali metal compounds including 1,4-dilithiobutane; 1,6-dilithiohexane; 1,4-dilithio-2-methyl-2-butene; dilithionaphthalene; dilithioanthracene; and the like. The terminal alkali metal atoms of the polymer can be displaced by reaction with various amide and thioamide compounds such as N,N-dimethylformamide, N,N-diethylacetamide, N,N-dimethyl-N,N'-dimethylaminoacetamide, N,N-dimethylaminoacetamide, N,N'-ethylaminoacetamide, N,N-dimethyl-N'-ethylaminoacetamide, N,N-dimethylacrylamide, N,N-dimethylmethacrylamide, N,N-dimethylisonicotinamide, phthalamide, N,N,N',N'-tetramethylphthalamide, N,N,N',N'-tetramethyloxamide, 1,2-cyclohexanedicarboxamide, N,N-dimethyl-2-furancarboxamide, quinoline-2-carboxamide, N-ethyl-N-methylquinolincarboxamide, etc; imide compounds such as N-methylsuccinimide maleimide, N-methylmaleimide, N-methylphthalimide, etc; lactam compounds such as N-methyl-ε-caprolactam, N-methyl-2-pyrrolidone, N-methyl-2-piperidone, N-methyl-2-quinolone, etc; urea compounds such as N,N,N',N'-tetramethylurea, N,N-dimethyl-N',N'-diphenylurea, N,N'-dimethylethyleneurea, etc; carbamic acid derivatives such as methyl carbamate, methyl N,N-diethylcarbamate, etc;

derivatives of isocyanuric acid such as N,N',N''-trimethylisocyanuric acid; and the corresponding sulfur-containing compounds.

The resulting amide or thioamide terminated polymers are capable of strongly interacting with oxidized carbon black in a tread rubber composition to improve hysteresis properties and to improve rolling resistance without adversely affecting wet traction.

A terminally functionalized polymer capable of interacting with an oxidized carbon black in accordance with the invention can also be produced by first reacting diene monomers or a mixture of diene monomers and one or more vinyl substituted aromatic monomers in the presence of an alkali metal catalyst or an alkaline earth metal catalyst to produce a metal-terminated polymer, and then reacting the metal-terminated polymer with an amine substituted benzophenone or thiobenzophenone such as 4-dimethylaminobenzophenone, 4-dimethylamino-4'-methylbenzophenone, 4,4'-diaminobenzophenone, etc., and the corresponding thiobenzophenones, with 4,4'-bis(dimethylamino)benzophenone (Michler's ketone) being preferred. The amine substituted benzophenone or thiobenzophenone bonded to terminals of the polymer chains combine and interact with oxidized carbon black to increase the affinity therebetween and to improve the hysteresis properties of a tread composition utilizing the combination. Further details and specific examples of polymers terminated with amine substituted benzophenones or thiobenzophenones are disclosed in U.S. Pat. No. 4,555,548 to Ueda et al which is in its entirety, incorporated by reference herein.

Alternatively, as disclosed in U.S. Pat. No. 4,616,069 to Watanabe et al, alkali metal or alkaline earth metal terminated diene or diene/vinyl substituted aromatic polymers or copolymers can be reacted with other aromatic or aliphatic amino organic compounds, including aminoaldehydes, aminoketones, aminothioaldehydes and aminothioketones. Examples of such compounds, in addition to the aforementioned benzophenones include N,N-dimethylaminoanthraquinone; 1,4-diaminoanthraquinone, 1,4-N,N,N',N'-tetramethyldiaminoanthraquinone; N-methylphenoxazine; 10-butylphenoxazine; N-methylacridone; 4-dimethylaminobenzaldehyde; 3,5-bis(dihexylamino) benzaldehyde; 2,4,6-tris(diethylamino)-benzaldehyde; 4-dicyclopentylaminobenzaldehyde; 4,5-bis(diethylamino)-1-naphthaldehyde; the corresponding aryl thioketones and aryl thioaldehydes; 3-dimethylaminopropionaldehyde; 3-diethylaminopropionaldehyde; 2-dimethylaminoacetaldehyde; dimethylaminopivalaldehyde; 1,5-bis(di-n-propylamino)-3-pentanone; 5-dodecylamino-n-heptaldehyde; 1,3-bis(diheptylamino)-2-propanone; 1,7-bis(methylethylamino)-4-heptanone; and the corresponding aliphatic thioaldehydes and aliphatic thioketones. The preferred compounds are 4,4'-bis(dimethylamino)benzophenone, 4-dimethylaminobenzaldehyde and the various alkylamine aldehydes. The foregoing terminally functionalized polymers have been found to interact favorably with oxidized carbon black to improve hysteresis and lower rolling resistance in tire tread compositions without adversely affecting wet traction properties.

Another class of nitrogen-containing compounds which can be reacted with alkali metal or alkaline earth metal terminated diene and diene/vinyl substituted aromatic polymers and copolymers to form terminally functionalized polymers which interact with oxidized carbon black in accordance with the invention are disubstituted carbodiimide compounds having a linkage of the general formula —N=C=N—. Specific examples include dimethyl-carbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide, phenylbenzylcarbodiimide, dimethylcyanamide, diethylcyanamide, dipropylcyanamide, dibutylcyanamide, dihexylcyanamide, dicyclohexylcyanamide, dibenzylcyanamide, diphenylcyanamide, methylpropylcyanamide, butylcyclohexylcyanamide, ethylbenzylcyanamide, propylphenylcyanamide, phenylbenzylcyanamide, etc.

Other nitrogen-containing compounds which can be reacted with alkali metal or alkaline earth metal terminated diene and diene/vinyl substituted aromatic polymers and copolymers to form terminally functionalized polymers capable of interacting with oxidized carbon black to produce an elastomeric polymer composition having reduced hysteresis include mono-, di- and polyisocyanates and the corresponding isothiocyanates. The isocyanates are preferably those compounds represented by the formula $R(N=C=X)_n$, wherein R can be an aliphatic containing from 2 to about 20 carbon atoms, a cycloaliphatic containing from 4 to about 20 carbon atoms or an aromatic containing from 6 to about 20 carbon atoms, n is an integer in the range from 1 to 3, and x is an oxygen or sulfur atom. Examples of suitable monoisocyanates include ethyl isocyanate, propyl isocyanate, ethyl thiocarbimide, cyclohexyl isocyanate, and the like. Examples of suitable diisocyanates and polyisocyanates include diphenyl diisocyanates, dichloro-arylene diisocyanates, 2,2,4'-triisocyanatediphenyl ether, triphenyl methane triisocyanate, benzene-1,2,4-triisocyanate, naphthalene-1,3,7-triisocyanate and the like.

Still another class of nitrogen-containing compounds which can be reacted with the alkali metal or alkaline earth metal terminated diene and diene/vinyl substituted aromatic polymers and copolymers to form a terminally functionalized polymer in accordance with the invention are urea derivatives having the formula

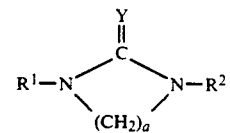

wherein Y represents an oxygen atom or sulfur atom, $R^1$ and $R^2$ are alkyl or alkoxy radicals having from 1 to 4 carbon atoms, and (a) is 2, 3 or 4. Specific examples of urea derivatives include 1,3-diethyl-2-imidazolidinone; 1,3-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone, 1,3-dimethylethylenethiourea, 1,3-dimethyl-3,4,5,6-tetrahydro-2-(1N)-pyrimidinone and so on. Particularly preferred is 1,3-dimethyl-2-imidazolidinone.

Amino terminated polymers suitable for use with oxidized carbon black in accordance with the invention can be obtained by reacting a p-lithio-N,N-bis(trialkylsilyl) substituted N-amino-aryl compound with conjugated dienes having from 4 to 8 carbon atoms or with a mixture of such conjugated dienes and a vinyl substituted aromatic monomer to produce a N,N-bis(trialkylsilyl) substituted amino-aryl-mono-terminated homopolymer or copolymer which can be readily converted to a primary aryl-amine terminated polymer by direct acid hydrolysis. Alternatively a di-N,N-bis(trialkylsilyl) substituted amino-aryl terminated polymer can be produced by reacting the lithium of the p-lithio-N,N-bis(-trialkylsilyl) substituted-N-amino-aryl component with the monomers and with a silicon compound expressed by the formula $Cl_2SiR_2^1$ wherein $R^1$ is typically an alkyl group having from 1 to 8 carbon atoms or an aryl group such as phenyl. The di-N,N-bis(trialkylsilyl) substituted amino-aryl terminated polymer can be converted to a di-primary aryl amine terminated polymer by direct acid hydrolysis. Further details regarding the production of mono- or di-primary aryl-amine terminated polymers suitable for use with the invention are disclosed in U.S. Pat. No. 4,015,061 which is hereby fully incorporated by reference herein.

Other suitable initiators for producing mono-amino-terminated diene or diene vinyl substituted aromatic polymers or copolymers are organo alkali tertiary amines such as 3-dimethylaminopropyllithium. Such mono-terminated polymers can be coupled using coupling agents such as dimethyl dichloro silicon. These mono- or di-amino-terminated polymers are capable of interacting with oxidized carbon black in accordance with the invention to improve hysteresis properties.

Alkali metal dialkylamides such as lithium diethylamide are suitable initiators for the anionic polymerization of diene and diene/vinyl substituted aromatic polymers and copolymers. The resulting mono-amide terminated polymers can be used in combination with oxidized carbon black, or further reacted with coupling agents such as dimethyldichloro silicon to produce a di-amide terminated polymer which can be used in combination with oxidized carbon black, to produce a composition in accordance with the invention. Further details regarding the use of lithium diethylamide initiator can be found in *Anionic Polymerization Initiated by Diethylamide in Organic Solvents*, A. C. Angood, S. A. Hurley, and P. J. T. Tait, Journal of Polymer Science, Polymer Chemistry Edition, Vol. 11, 2277-2791 (1973).

Other nitrogen-containing organo alkali initiators for diene polymerization and diene/vinyl substituted aromatic copolymerization in which the terminal nitrogen-containing organic radical interacts with oxidized carbon black to improve hysteresis and lower rolling resistance without adversely affecting wet traction include alkali metal dialkyl amines such as lithium dimethylamine, lithium diethylamine, lithium di-n-butylamine and lithium di-i-propylamine. Additionally, various nitrogen containing heterocyclic organo alkali initiators wherein the alkali metal atom is bonded to the nitrogen atom, such as lithium morpholine, lithium piperidine, and lithium piperazine can be used to produce the terminally functionalized polymers of the invention. The use of various nitrogen-containing organo alkali initiators is disclosed in *Polymerization and Copolymerization with Lithium-Nitrogen-Bonded Initiator*, T. C. Cheng, "Anionic Polymerization", J. E. McGrath, Editor, American Chemical Society Symposium Series 166 (1981). As usual the mono-nitrogen-containing radical terminated polymer can be used directly with the oxidized carbon black of the invention, or coupled to another mono-nitrogen-containing radical terminated polymer and then combined with the oxidized carbon black of the invention.

The terminally functionalized diene polymers and copolymers of the invention can also have an end or terminal group containing a tin atom. The tin containing end group provides the polymer with a functional group which can strongly interact with oxidized carbon black to improve hysteresis properties and reduce rolling resistance without adversely affecting wet traction properties.

One well known method of producing such tin compound terminated polymers is to react a lithium end-capped polymer with a tin chloride compound. Another method is to employ a tin-containing organo-metal compound as a polymerization initiator. Examples of suitable tin-containing organo-metal compounds are disclosed in U.S. patent application No. 636,961, hereby incorporated by reference herein.

A preferred method of producing a diene polymer or diene/vinyl substituted aromatic copolymer having a tin containing end group on substantially every polymer chain makes use of a tin containing initiator which is the reaction product of a triorgano substituted-tin halide or a hexaorgano substituted di-tin compound with lithium metal in the presence of a suitable solvent. Preferred is a triorgano substituted-tin halide which has the general formula $R_3SnX$. The organic moiety R is selected from the group consisting of alkyls having from about 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and aralkyl groups include phenyl, benzyl and the like.

The tin containing initiators may also be produced by other means. For example, the initiator may be formed as the reaction product of a hexaorgano-substituted di-tin compound $R_3SnSnR_3$ containing a tin-tin bond, with lithium metal (where R is as described hereinabove). Preferred di-tin compounds have between 6 and 120 carbon atoms, such as hexabutyldi-tin.

It is preferred that the initiators according to the present invention are the reaction product of from about 93 to about 99 percent by weight of an organotin compound and from about 1 to about 7 percent by weight of lithium.

The halide constituent X of the triorgano substituted-tin halide includes chlorides and bromides. Lithium is preferably present as a reactant in the form of lithium metal, and may also be present as a dispersion in mineral oil. Preferably, the solvent employed is tetrahydrofuran, tetramethylethylenediamine, or diethylene methyl ether (diglyme).

The desired reaction product of the triorgano substituted-tin halide and the lithium is a triorgano substituted-tin lithium compound. The preferred initiator has the general formula $R_3SnLi$, where R is as defined hereinabove. One preferred catalyst is the reaction product of tributyl tin chloride and lithium metal in tetrahydrofuran, forming tributyl tin lithium.

Polymerization is usually conducted in a conventional solvent for anionic polymerizations such as hexane, cyclohexane, benzene and the like. Other techniques for polymerization, such as semi-batch and continuous polymerization may be employed. In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed.

A batch polymerization is begun by charging a blend of monomer(s) and solvent to a suitable reaction vessel, followed by the addition of the polar coordinator (if employed) and the initiator compound previously described. The reactants are heated to a temperature of from about 20° to about 200° C., and the polymerization is allowed to proceed for from about 0.1 to about 24 hours. A tin atom is derived from the initiator compound and attaches at the initiation site. Thus, substantially every resulting polymer chain has the following general formula $$R_3SnYLi$$

where R is as described above, the tin atom is derived from the polymerization initiator, and Y is a divalent polymer radical which is derived from any of the foregoing diene homopolymers, monovinyl aromatic polymers, diene/monovinyl aromatic random copolymers and block copolymers. The monomer addition at the lithium end causes the molecular weight of the polymer to increase as the polymerization continues.

To terminate the polymerization, and thus control polymer molecular weight, a terminating agent may be employed. Active hydrogen compounds such as water or alcohol can be used, or compounds providing terminal functionality (i.e., "endcapping") can be used such as tin tetrachloride, $R_3SnCl$, $R_2SnCl_2$, $RSnCl_3$, carbodiimides, N-methylpyrrolidinone, cyclic amides, cyclic ureas, isocyanates, Schiff bases, 4,4'-bis(diethylamino) benzophenone, and the like, where R is as described hereinabove. The terminating agent is added to the reaction vessel, and the vessel is agitated for about 1 to about 1000 minutes. Preferably, the terminating agent is a tin containing compound suitable for use as a terminator, such as tin tetrachloride or tributyl tin chloride. The chlorine on the tin reacts with the lithium end group of the resulting polymer chain, forming a polymer having the following general formula where R and Y are as previously described:

$$[R_3SnY]_aSnR_{4-a}$$

where a is an integer from 1 to 3.

The resultant terminally functionalized polymer may be recovered from the polymer solution and dried using conventional procedures. Thus, for example, the polymer can be recovered from solution by coagulation either by adding a sufficient volume of a nonsolvent liquid (e.g. an alcohol) for the polymer to the solution or alternatively by adding the polymer solution to a sufficient volume of the non-solvent. It is usually desirable to carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

The terminally functionalized polymers generally have a number average molecular weight in the range between about 50,000 and 500,000, desirably from about 100,000 to about 200,000, and are substantially functionalized with at least 10 percent, desirably at least 25 or 50 percent, and preferably at least about 60 percent of the terminals having functional end groups.

The preferred carbon blacks of the invention include generally any type of carbon black produced by the incomplete combustion or thermal decomposition of natural gas or petroleum oil. Such carbon blacks include channel blacks, furnace black, and thermal blacks. The carbon blacks are oxidized using any suitable conventional technique such as oxidation by ozone, dichromate, or oxidizing acids, with oxidation using nitrogenous oxidizing acids or ozone being preferred. Examples of suitable methods of producing oxidized carbon blacks are disclosed in U.S. Pat. Nos. 3,914,148; 4,075,140; and 4,075,157 which are hereby incorporated by reference.

The oxidized carbon blacks used with the invention are characterized by a relatively high acid and/or quinone content, with the carbon blacks generally having total acid content of at least about 0.1 milliequivalents per gram of oxidized carbon black, and preferably at least 0.5 milliequivalents per gram of oxidized carbon, and/or a quinone content of at least 0.2 milliequivalents per gram and preferably at least 0.5 milliequivalents per gram. It has been discovered that when the oxidized carbon blacks are combined with the terminally functionalized polymers of the invention, higher acid concentrations for the carbon blacks generally result in lower tan-δ values and consequently lower rolling resistance for tires utilizing the disclosed composition in the tread portion of the tire.

The oxidized carbon blacks used with the invention are further characterized by their relatively high volatile content, with suitable oxidized carbon blacks generally having a volatile content of at least about 2 percent by weight and preferably at least about 3.5 percent by weight. The average particle size of the carbon blacks used in connection with the invention is generally in the range of from about 100 to 600 angstroms, and preferably in the range from about 200 to about 400 angstroms.

It has been found that the terminally functionalized polymers having tin containing end groups interact more strongly with ozone oxidized carbon blacks and that the terminally functionalized polymers having nitrogen containing end groups interact more strongly with the acid oxidized carbon blacks. Accordingly, acid oxidized carbon black is preferably used in combination with the polymers having nitrogen containing end groups and ozone oxidized carbon black is preferably used in combination with the polymers having tin containing end groups.

The hysteresis properties of tread compositions according to the invention can be tailored by mixing the oxidized carbon black with regular nonoxidized carbon black and/or by varying the extent of oxidation. The amount of total carbon black in the tire tread composition should be in the range of from about 30 to about 80 parts by weight per 100 parts by weight of polymer, and preferably from about 40 to about 60 parts by weight per 100 parts by weight of polymer, with at least 10 percent by weight, more desirably from about 30 percent to about 80 percent, and preferably about 50 percent to about 80 percent, of the carbon black being oxidized.

Elastomer compositions of the invention can be prepared by compounding or mixing the terminally functionalized polymers herein with carbon black and other conventional rubber additives such as fillers, plasticizers, antioxidants, curing agents and the like using standard rubber mixing equipment and procedures. For example, tire treads can be produced by kneading the terminally functionalized polymers and oxidized carbon blacks of the invention with various compounding chemicals commonly used in the rubber industry, such as sulfur, stearic acid, zinc oxide, various vulcanization accelerators such as thiazoles, thiurams, and sulfuramides, carbon black, reinforcing agents such as silica and calcium carbonate, and process oils, by means of a mixer such as a Banbury mixer, and by molding the rubber compound and vulcanizing it. Such elastomer compositions when vulcanized using conventional rubber vulcanization conditions have reduced hysteresis properties and are particularly well adapted for use as tread rubbers for tires having reduced rolling resistance, but are also suitable for use in the fabrication of other rubber products requiring low hysteresis such as tire sidewalls, belts and shock absorbers.

The following examples are submitted for the purpose of further illustrating the nature of the present invention and should not be regarded as a limitation on the scope thereof.

EXAMPLES AND TEST RESULTS

All of the examples were prepared in a Brabender mixer with the mixer jacket preheated to a starting temperature of 175° F. Characteristics of the various polymers used in the examples are summarized in Table I. Each of the examples was prepared in accordance with the following formulation, wherein the numeric values represent parts by weight.

| Elastomer component | 100 |
| --- | --- |
| Carbon Black N343 | 54 |
| Oil | 27.6 |
| Zinc Oxide | 3.0 |
| Stearic Acid | 2.0 |
| Wax | 0.75 |
| Tackifier | 3.5 |
| Antioxidant | 0.95 |
| Sulfur | 2.25 |
| Accelerator | 1.2 |

The elastomer component for each of the formulations used in the examples was a styrene-butadiene rubber. The styrene content of the rubber is given in Table I as a percentage by weight of the elastomer component, with the balance of the elastomer component being butadiene. The percentage of butadiene monomers incorporated in the rubber polymer which have pendant vinyl groups, i.e. 1,2-microstructure content, is also provided in Table I under the heading "Vinyl, %".

EXAMPLES 1-12

Examples 1-12 of Table II illustrate the effect of varying oxidation levels of ozone oxidized carbon black for di-tin terminated, di-Schiff base terminated, combination mono-tin mono-Schiff base terminated, and unmodified styrene-butadiene rubber compositions.

Either an unoxidized, a moderately ozone oxidized, or a severely ozone oxidized carbon black was used for each of the examples of Table II.

Examples 1-3 are for an elastomer having linear polymer molecules which were terminated at each end by a tin containing compound. In Example 1 the carbon black was unoxidized, whereas in Examples 2 and 3 the carbon black was moderately and severely oxidized respectively. The results show an unexpected decrease in the tan-$\delta$ at 50° C. which corresponds to decreased rolling resistance as the oxidation level of the carbon black is increased. The corresponding tan-$\delta$ at 0° C. for Examples 1-3 show substantially no change as the oxidation level of the carbon black is increased, indicating that while the combination of tin-terminated polymer with oxidized carbon black provides improved rolling resistance as the level of oxidation is increased, there is no corresponding decrease in wet traction properties. Table I also shows other properties related to processability, elastic recovery, durability, abrasion and tear resistance.

Examples 4-6 are for an elastomer having linear polymer molecules which were terminated with a tin containing compound at one end and a Schiff base compound at the other. Unoxidized carbon black was used in Example 4 and in Examples 5 and 6 moderately and severely oxidized carbon black were used respectively. The results indicate substantial and unexpected improvement in rolling resistance, i.e. reduced tan-$\delta$ at 50° C., with only a small reduction in wet traction as the oxidation level of the carbon black was increased.

Examples 7-9 are for an elastomer having linear polymer molecules which were terminated at each end with a Schiff base compound. Unoxidized, moderately oxidized and severely oxidized carbon black were used in Examples 7, 8 and 9, respectively. The results show that for styrene-butadiene polymers terminated at each end with a Schiff base compound, the tan-$\delta$ at 50° C. decreases significantly whereas the tan-$\delta$ at 0° C. decreases only slightly as the oxidation level of the carbon black is increased. The results indicate that Schiff base modified styrene-butadiene rubber when combined with oxidized carbon black in accordance with the invention unexpectedly show a decrease in rolling resistance without a significant detrimental effect on wet traction properties as the oxidation level of the carbon black is increased.

For comparison, an unmodified styrene-butadiene rubber compounded with unoxidized, moderately oxidized, and severely oxidized carbon black were used for Examples 10, 11 and 12, respectively. The results indicate that rolling resistance and wet traction of the unmodified polymers are not improved by the oxidation level of the carbon black.

The results of Table II generally demonstrate that styrene-butadiene polymers terminally functionalized in accordance with the invention show substantial and unexpected reduction in tan-$\delta$ at 50° C. without any substantial reduction in tan-$\delta$ at 0° C. when combined with ozone oxidized carbon black, and that the effect on tan-$\delta$ at 50° C. is more pronounced as the level of oxidation of the carbon black is increased. Unmodified styrene-butadiene polymers, on the other hand, show no substantial change in tan-$\delta$ at 50° C. when combined with oxidized carbon black. The results indicate that substantial reductions in rolling resistance without significantly adversely affecting wet traction can be achieved with the novel combination of oxidized carbon black compounded with diene polymers terminally functionalized in accordance with the invention.

TABLE I

| Polymer | Example(s) | Terminals | Mn | Mw | Mw/Mn | Total Styrene, % | Vinyl, % (Bd = 100) | Tg, °C. |
|---|---|---|---|---|---|---|---|---|
| A | 1,2,3 | Sn—Sn | 187,000 | 240,000 | 1.28 | 28.7 | 48.5 | −42.0 |
| B | 4,5,6 | Sn—SB | 131,000 | 155,000 | 1.18 | 19.8 | 54.5 | −42.2 |
| C | 7,8,9 | SB—SB | 167,000 | 226,000 | 1.36 | 19.9 | 54.8 | −39.8 |
| D | 10,11,12,17,18 | Bu—H | 200,000 | 600,000 | 3.0 | 35.0 | 12.0 | −51 |
| E | 13,14,15,16 | SB—SB | 166,000 | 248,000 | 1.50 | 22.5 | 60.8 | −37.1 |
| F | 22,33 | Bu—DMI | 132,000 | 147,000 | 1.11 | 20.0 | 61.5 | −37.3 |
| C and D | 19,20,21 | (A mixture of 25% polymer C and 75% Polymer D) | | | | | | |

Sn initiation from tributyl tin
Sn termination is from the reaction of tributyl tin chloride with a terminal lithium
SB initiation is from the butyl lithium adduct of dimethylaminobenzylidene methylamine
SB termination is from the reaction of dimethylamino benzylidene butylaniline with a terminal lithium
DMI termination is from the reaction of 1,3-dimethyl-2-imidazolidinone with a terminal lithium
Bu initiation is from butyl lithium
H termination is from neutralization of a terminal lithium with alcohol

TABLE II

| Property | 1 | 2 | 3 | 4 | 5 | 6 |
|---|---|---|---|---|---|---|
| Polymer | A | A | A | B | B | B |
| Carbon Black Type | Un-OX | Mod-OX | Svr-OX | Un-OX | Mod-OX | Svr-OX |
| Mix Drop °F. | 295 | 285 | 301 | 279 | 286 | 290 |
| Mooney Viscosity ML4/212° F. | 69 | 76 | 80 | 42 | 54 | 62 |
| Ring Stress/Strain, PSI | | | | | | |
| 100% Modulus | 311 | 372 | 339 | 357 | 349 | 383 |
| 300% Modulus | 1706 | 1866 | 1729 | 1651 | 1732 | 1939 |
| Tensile Strength | 2616 | 3034 | 2759 | 2536 | 2549 | 2816 |
| % Elongation | 457 | 478 | 475 | 459 | 444 | 440 |
| Ring Tear 340° F. PPI | 134 | 154 | 135 | 151 | 116 | 91 |
| Shore A Durometer | 55 | 54 | 54 | 56 | 54 | 55 |
| 150° F. | 53 | 52 | 53 | 54 | 52 | 52 |
| 212° F. | | | | | | |
| Rebound % | | | | | | |
| 73° F. | 40 | 38.8 | 38.8 | 40 | 45.4 | 47 |
| 150° F. | 65.2 | 63.6 | 65 | 57.2 | 57.2 | 66.8 |
| 212° F. | | | | | | |
| Picco Abrasion, cc × $10^3$ | 11.8 | 13.7 | 14.4 | 13.9 | 13.6 | 15 |
| Lambourn Abrasion, cc × $10^2$ | | | | | | |
| 25% Slip | 13.4 | 12.6 | 13.6 | 12.8 | 12.6 | 12.8 |
| 60% Slip | 13.2 | 14.4 | 14.1 | 12.9 | 14.4 | 13.7 |
| Carbon Black Dispersion, % | | | | | | |
| Surfanalyzer Microscopy | 81.7 | 67.8 | 67 | 82.2 | 62.7 | 66.9 |
| Dynastat 1 Hz tan-δ 0° C. | 0.3236 | 0.3244 | 0.3343 | 0.3051 | 0.2495 | 0.232 |
| 23° C. | 0.1506 | 0.1525 | 0.1353 | 0.2029 | 0.1426 | 0.126 |
| 50° C. | 0.0987 | 0.0964 | 0.0899 | 0.1502 | 0.0966 | 0.0878 |
| Rheomet 7%, 10 Hz, 23° C. | | | | | | |
| dyne/cm 2 × $10^7$ G' | 1.899 | 1.91 | 1.954 | 2.304 | 1.945 | 1.982 |
| $10^6$ G" | 3.73 | 3.662 | 3.675 | 5.429 | 3.183 | 2.942 |
| tan-δ | 0.1964 | 0.1917 | 0.1881 | 0.2356 | 0.1637 | 0.1484 |
| (0.05%–15%) Delta G' | 0.879 | 0.845 | 0.845 | 2.203 | 0.72 | 0.651 |
| Specific Gravity | 1.112 | 1.119 | 1.12 | 1.101 | 1.101 | 1.102 |
| Bound Rubber, % | 39.8 | 39.5 | 37.1 | 29.2 | 39.6 | 45.9 |

| Property | 7 | 8 | 9 | 10 | 11 | 12 |
|---|---|---|---|---|---|---|
| Polymer | C | C | C | D | D | D |
| Carbon Black Type | Un-OX | Mod-OX | Svr-OX | Un-OX | Mod-OX | Svr-OX |
| Mix Drop °F. | 292 | 288 | 295 | 273 | 273 | 273 |
| Mooney Viscosity ML4/212° F. | 70 | 84 | 94 | 51 | 54 | 55 |
| Ring Stress/Strain, PSI | | | | | | |
| 100% Modulus | 366 | 394 | 355 | 330 | 276 | 282 |
| 300% Modulus | 1713 | 2033 | 1806 | 1620 | 1297 | 1257 |
| Tensile Strength | 2397 | 3123 | 2813 | 2719 | 2432 | 2510 |
| % Elongation | 431 | 456 | 462 | 490 | 551 | 561 |
| Ring Tear 340° F. PPI | 109 | 101 | 80 | 182 | 204 | 200 |
| Shore A Durometer | 57 | 5 | 54 | 57 | 56 | 55 |
| 150° F. | 54 | 53 | 53 | 52 | 54 | 51 |
| 212° F. | | | | | | |
| Rebound % | | | | | | |
| 73° F. | 37.8 | 40.2 | 42.2 | 39.6 | 38.8 | 39.2 |
| 150° F. | 60.8 | 65.2 | 67.6 | 55.2 | 54.2 | 54.4 |
| 212° F. | | | | | | |
| Picco Abrasion, cc × $10^3$ | 13.6 | 14.5 | 13.7 | 10.3 | 11.7 | 15.3 |
| Lambourn Abrasion, cc × $10^2$ | | | | | | |
| 25% Slip | 12.2 | 13.4 | 13.4 | 11.6 | 12.2 | 12 |
| 60% Slip | 13.7 | 13.3 | 13.1 | 14.5 | 15.6 | 16.7 |
| Carbon Black Dispersion, % | | | | | | |
| Surfanalyzer Microscopy | 65.2 | 63.8 | 48.9 | 93.4 | 83.3 | 75.1 |
| Dynastat 1 Hz tan-δ 0° C. | 0.3371 | 0.3077 | 0.3003 | 0.3295 | 0.3369 | 0.3187 |

TABLE II-continued

|  | | | | | | |
|---|---|---|---|---|---|---|
| 23° C. | 0.1899 | 0.1421 | 0.1258 | 0.2249 | 0.23 | 0.2267 |
| 50° C. | 0.1309 | 0.0919 | 0.0828 | 0.1615 | 0.1719 | 0.1671 |
| Rheomet 7%, 10 Hz, 23° C. | | | | | | |
| dyne/cm 2 × $10^7$ G' | 2.174 | 1.841 | 1.888 | 1.943 | 2.21 | 2.097 |
| $10^6$ G" | 5.19 | 3.313 | 3.148 | 5.336 | 5.798 | 5.594 |
| tan-$\delta$ | 0.2387 | 0.1799 | 0.1667 | 0.2763 | 0.2705 | 0.2668 |
| (0.05%–15%) Delta G' | 1.995 | 0.81 | 0.931 | 2.494 | 2.739 | 2.896 |
| Specific Gravity | 1.102 | 1.109 | 1.109 | 1.12 | 1.12 | 1.12 |
| Bound Rubber, % | 30.6 | 36.2 | 40.7 | 24.4 | 20.1 | 19.1 |

EXAMPLES 13-18

Examples 13-18 of Table III illustrate the effect of varying oxidation levels of acid oxidized carbon black compounded with a styrene-butadiene polymer terminally functionalized at each end with a Schiff base compound. Examples 13-18 were otherwise prepared in a manner essentially identical to that of Examples 1-12. The acid oxidized carbon blacks used in Examples 13-18 had the following characteristics:

| Carbon Black | Quinone Content (milliequivalents/gm) | Acid Content (milliequivalents/gm) |
|---|---|---|
| Mildly Oxidized | 0.43 | 0.42 |
| Moderately Oxidized | 0.60 | 0.68 |
| Severely Oxidized | 0.61 | 0.95 |

Examples 13-16 are for a Schiff base modified styrene-butadiene polymer compounded with the unoxidized, the mildly oxidized, the moderately oxidized, and the severely oxidized carbon black, respectively.

The results demonstrate that the tan-$\delta$ at 50° C. for the Schiff base terminated B polymer decreases monotonically with increasing oxidation level of the carbon black while the tan-$\delta$ at 0° C. does not change significantly. This indicates that as the oxidation level of the carbon black is increased for the Schiff base terminated polymer compositions, the rolling resistance will decrease without adversely affecting wet traction properties. As shown in Table III, improved rolling resistance is achieved with increasing acid content.

For purposes of comparison, Examples 17 and 18 are for an unmodified styrene-butadiene polymer combined with unoxidized and severely acid oxidized carbon black, respectively. These results show that there is only a slight decrease in tan-$\delta$ at 50° for unmodified polymer when the severely oxidized carbon black is used instead of an unoxidized carbon black.

The results of Table III generally demonstrate a substantial reduction in tan-$\delta$ at 50° C. when acid oxidized carbon blacks are compounded with Schiff base terminated polymers, whereas unmodified polymers show no reduction in tan-$\delta$ at 50° C. These results suggest that unexpected reductions in rolling resistance can be achieved when acid oxidized carbon blacks are compounded with the terminally functionalized polymers of the invention.

The compositions of Examples 13-16 were tested and compared to one another for wearability. Wearability tests were performed in accordance with a modified version of the Government Uniform Tire Quality Grading Procedure. The tires were inflated to a pressure of 26 psig under a load of 1,050 pounds and driven at variable speeds over a test track for 6,400 miles. The wear results, expressed as a rating relative to that of Example 13, are as follows:

| Example | Rating |
|---|---|
| 13 | 100 |
| 14 | 107 |
| 15 | 113 |
| 16 | 97 |

The results unexpectedly indicate that the compositions incorporating oxidized carbon blacks, in addition to having lower hysteresis, generally wore as well or better than those incorporating unoxidized carbon black.

TABLE III

| Property | 13 | 14 | 15 | 16 | 17 | 18 |
|---|---|---|---|---|---|---|
| Polymer | E | E | E | E | D | D |
| Carbon Black Type | Untrt | Mildly Oxidized | Moderately Oxidized | Severely Oxidized | Untrt | Severely Oxidized |
| Drop Temp. °F. | 297 | 300 | 304 | 310 | 298 | 301 |
| Mooney Viscosity ML4/212° F. | 72 | 93 | 96 | 100 | | |
| Ring Stress/Strain, PSI | | | | | | |
| 100% Modulus | 387 | 381 | 403 | 385 | 318 | 290 |
| 300% Modulus | 1900 | 1929 | 2088 | 2007 | 1638 | 1447 |
| Tensile Strength | 2761 | 2823 | 3052 | 3026 | 2156 | 2400 |
| % Elongation | 445 | 457 | 452 | 461 | 426 | 506 |
| Ring Tear 340° F. PPI | 95 | 86 | 72 | 91 | 114 | 168 |
| Shore A | | | | | | |
| 73° F. | 60 | 63.5 | 62.5 | 61 | | |
| 150° F. | 56.5 | 57.5 | 57.5 | 56 | | |
| 212° F. | 57 | 57 | 57 | 56.5 | | |
| Rebound % | | | | | | |
| 73° F. | 31.4 | 33.8 | 34.2 | 35.8 | | |
| 150° F. | 62.4 | 67.2 | 69.2 | 70.4 | | |
| 212° F. | 68.2 | 73.6 | 74.4 | 74.6 | | |
| Picco. Vol. Loss, cc × $10^2$ | 11.3 | 13.13 | 14.17 | 14.8 | | |
| Carbon Black Dispersion, % | | | | | | |
| Surfanalyzer Microscopy | 90 | 95.3 | 91.2 | 81.5 | 76.1 | 68.9 |
| Dynastat 1 Hz tan-$\delta$ 0° C. | | | | | | |

TABLE III-continued

| Property | 13 | 14 | 15 | 16 | 17 | 18 |
|---|---|---|---|---|---|---|
| 0° C. | 0.3467 | 0.3042 | 0.3266 | 0.3226 | | |
| 23° C. | 0.176 | 0.1383 | 0.1328 | 0.1184 | | |
| 50° C. | 0.1179 | 0.08853 | 0.08167 | 0.07424 | 0.2325 | 0.2123 |
| Rheomet 7%, 10 Hz, 23° C. | | | | | | |
| dyne/cm 2 × $10^7$ G' | 2.132 | 2.029 | 2.044 | 2.162 | 2.052 | 2.194 |
| $10^6$ G" | 4.842 | 3.764 | 3.637 | 3.865 | 5.669 | 5.6 |
| tan-δ | 0.2271 | 0.1855 | 0.1779 | 0.1787 | 0.2763 | 0.2552 |
| (0.05%–15%) Delta G' | 1.271 | 0.779 | 0.764 | 0.929 | 2.974 | 2.713 |
| Specific Gravity | 1.115 | 1.12 | 1.122 | 1.122 | | |
| Bound Rubber, % | 31.9 | 39.4 | 42.1 | 42.8 | | |

EXAMPLES 19–21

Examples 19–21 of Table IV generally illustrate the effect of varying the amount of oxidized carbon black while keeping the total amount of carbon black constant. Example 19 is a blend of two formulations, the first comprising 54 parts by weight of unoxidized carbon black per 100 parts by weight of the non-functionalized polymer D, the second formulation comprising 54 parts by weight of unoxidized carbon black per 100 parts by weight of the Schiff base difunctionalized polymer C, the blend of Example 19 consisting of 3 parts by weight of the first formulation and 1 part by weight of the second formulation. Example 20 is a blend of two formulations, the first comprising 54 parts by weight of oxidized carbon black per 100 parts by weight of the non-functionalized polymer D, the second formulation comprising 54 parts by weight of unoxidized carbon black per 100 parts by weight of the Schiff base difunctionalized polymer C, the blend of Example 20 consisting of 3 parts by weight of the first formulation and 1 part by weight of the second formulation. Example 21 is also a blend of two formulations, the first comprising 54 parts by weight of oxidized carbon black per 100 parts by weight of the non-functionalized polymer D, the second formulation comprising 54 parts by weight of oxidized carbon black per 100 parts by weight of the Schiff base difunctionalized polymer C, the blend of Example 21 consisting of 3 parts by weight of the first formulation and 1 part by weight of the second formulation.

The results generally indicate that a blend of oxidized and unoxidized carbon blacks provides a substantial reduction in rolling resistance and is only slightly less effective than a compound using only oxidized carbon black.

TABLE IV

| Property | 19 | 20 | 21 |
|---|---|---|---|
| 25% Polymer C | Reg-CB | OX-CB | OX-CB |
| 75% Polymer D | Reg-CB | Reg-CB | OX-CB |
| 164° C. t'90 (minutes) | 16 | 20 | 20 |
| Ring Stress/Strain, PSI | | | |
| 100% Modulus | 372 | 342 | 371 |
| 300% Modulus | 1735 | 1725 | 1886 |
| Tensile Strength | 2467 | 2695 | 2641 |
| % Elongation | 446 | 474 | 437 |
| Ring Tear, 340° F. PPI | 108 | 74 | 79 |
| Carbon Black Dispersion, % | | | |
| Surfanalyzer Microscopy | 78.2 | 67.8 | 62.7 |
| Mechanical Energy 1 Hz tan-δ | | | |
| 0° C. | 0.284 | 0.253 | 0.247 |
| 23° C. | 0.168 | 0.136 | 0.134 |
| 50° C. | 0.121 | 0.095 | 0.092 |

EXAMPLES 22 AND 23

Examples 22 and 23 of Table V show the effect of using the severely acid oxidized carbon black with a 1,3-dimethyl-2-imidazolidinone (DMI) modified styrene-butadiene polymer. The DMI-terminated polymer was compounded with an unoxidized carbon black in Example 22 and with the severely acid oxidized carbon black in Example 23. The compositions are otherwise similar to those of the previous examples.

The results show that a significant and unexpected reduction in tan-δ at 50° C. is achieved with the oxidized carbon black. This reduction in tan-δ at 50° C. suggests a significant reduction in rolling resistance without a substantial adverse effect on wet traction, as indicated by the small change in tan-δ at 0° C.

CONCLUSION

The results indicate that unexpected reductions in the rolling resistance of elastomer tread composition can be achieved by the novel combination of oxidized carbon black compounded with diene polymers and diene-vinyl substituted aromatic copolymers terminally functionalized in accordance with the invention disclosed herein.

TABLE V

| Property | 22 | 23 |
|---|---|---|
| Polymer | F | F |
| Carbon Black Type | Untrt | Severely Oxidized |
| Drop Temp. °F. | 299 | 307 |
| Mix Time | 7'45" | 6'50" |
| ML4/212° F. | | |
| Ring Stress/Strain, PSI | | |
| 100% Modulus | 380 | 355 |
| 300% Modulus | 2051 | 1951 |
| Tensile Strength | 2379 | 2382 |
| % Elongation | 385 | 400 |
| Ring Tear 340° F. PPI | 63 | 56 |
| Carbon Black Dispersion, % | | |
| Surfanalyzer Microscopy | 69.8 | 41.7 |
| Dynastat 1 Hz tan-δ | | |
| 0° C. | 0.3463 | 0.3084 |
| 23° C. | 0.1444 | 0.1132 |
| 50° C. | 0.1118 | 0.0901 |

While in accordance with the Patent Statutes, the best mode and preferred embodiment has been set forth, the scope of the invention is not limited thereto, but rather by the scope of the attached claims.

What is claimed is:

1. A composition comprising an elastomeric polymer functionally modified by a terminal group, and carbon black particles dispersed therein, with at least 10 percent by weight of said carbon black being oxidized carbon black, the functionalized sites at the terminal portions of the polymer molecules interacting with the oxidized sites on the carbon black to increase affinity between the carbon black and the polymer to reduce hysteresis.

2. The composition of claim 1, wherein said elastomeric polymer is polymerized from at least one diene monomer or at least one diene monomer and at least one vinyl substituted aromatic monomer.

3. The composition of claim 2, wherein said polymer is polybutadiene or a copolymer of butadiene and styrene.

4. The composition of claim 2, wherein said polymer molecules are anionically initiated and substantially terminally functionalized by reaction with a tin group- or a nitrogen group-containing compound.

5. The composition of claim 4, wherein the polymer molecules are anionically initiated with a triorgano substituted-tin lithium compound or an initiator formed by reacting an organolithium compound with a nitrogen-containing functionalizing agent.

6. The composition of claim 4, wherein said terminal compound is an N,N-dialkyl-aminoaldehyde, N,N-dialkyl-aminoketone, N,N-dialkyl-aminothioaldehyde, N,N-dialkyl-aminothioketone, N,N-dialkyl-amide, N,N-dialkylthioamide, alkyl imine, N,N-dialkyl-amine substituted thiobenzophenone, carbodiimide, carbamide or N,N,N',N'-tetra alkyl urea derivative, N,N-dialkyl-aryl amine, N,N-dialkyl-aliphatic amine, N,N'-disubstituted cyclic urea, N-substituted cyclic amide, or a mono-, di or polyisocyanate.

7. The composition of claim 4, wherein said terminal compound has the formula:

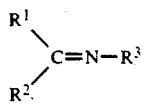

wherein R$^1$ and R$^2$ are selected from the group consisting of hydrogen, alkyl, cycloalkyl, aryl, dialkylaminoaryl, aralkyl, and aprotic O, N and S-containing alkyl, cycloalkyl, aryl, and aralkyl groups; wherein R$^3$ is selected from the group consisting of alkyl, cycloalkyl, aryl, dialkylaminoaryl, aralkyl, and aprotic O, N and S-containing alkyl, cycloalkyl, aryl and aralkyl groups;
with the proviso that at least one of the R$^1$, R$^2$, and R$^3$ groups must be a dialkylaminoaryl group and that not all of the R$^1$, R$^2$, and R$^3$ groups can be aryl groups, and wherein R$^1$, R$^2$, and R$^3$ independently have from 1 to 20 carbon atoms.

8. The composition of claim 4, wherein said terminal compound is a dialkylaminobenzylidene alkylamine, a dialkylaminobenzylidene aniline, a dialkylaminobenzylidene alkoxyaniline, a dialkylamino benzylidene dialkylaminoaniline, a benzylidene dialkylaminoaniline, an alkoxybenzylidene dialkylaminoaniline or an α,α-dialkylalkylidene dialkylaminoanilines.

9. The composition of claim 4, wherein at least 10 percent of said terminal end groups of said polymer are functionalized with said tin containing or said nitrogen containing compound.

10. The composition of claim 9, wherein said functionalized polymer has a number average molecular weight of from about 100,000 to about 200,000.

11. The composition of claim 4, wherein said oxidized carbon black has an acid content of at least 0.1 milliequivalents per gram.

12. The composition of claim 10, wherein said oxidized carbon black has a volatile content of at least 2 percent by weight.

13. The composition of claim 4, wherein said terminal compound is 4,4'-bis(dimethylamino)benzophenone, 4-dimethylaminobenzaldehyde, N-methyl pyrolidinone, 1,3-dimethyl-2-imidazolidinone, dicyclohexlcarbodiimide, diphenylcarbodiimide, or diphenyl cyanamide.

14. The composition of claim 4, wherein said terminal compound is a substituted tin halide having the formula

wherein a is zero or an integer in the range 1 to 3, x is a chlorine or bromine atom, and R is an alkyl having 1 to about 20 carbon atoms, an aryl having from 6 to about 20 carbon atoms, or an aralkyl having from about 7 to about 20 carbon atoms, and wherein X is a halide.

15. The composition of claim 4, wherein said functionally modified elastomeric polymer has a number average molecular weight of from about 100,000 to about 200,000, said oxidized carbon black is an acid oxidized carbon black having an acid content of at least 0.1 milliequivalents per gram and a volatile content of at least 2 percent by weight.

16. The compoisition of claim 15, wherein said terminal compound is an N,N-dialkyl-aminoaldehyde, N,N-dialkyl-aminoketone, N,N-dialkyl-aminothioaldehyde, N,N-dialkyl-aminothioketone, N,N-dialkyl-amide, N,N-dialkyl-thioamide, alkyl imine, N,N-dialkyl-amine substituted thiobenzophenone, carbodiimide, carbamide or N,N,N',N'-tetra alkyl urea derivative, N,N-dialkyl-aryl amine, N,N-dialkyl-aliphatic amine, N,N'-disubstituted cyclic urea, N-substituted cyclic amide, or a mono-, di or polyisocyanate.

17. A composition comprising an elastomeric polymer which is polymerized from at least one diene monomer or at least one diene monomer and at least one vinyl substituted aromatic monomer, the polymer molecules being anionically initiated and substantially terminally functionalized by reaction with a tin group-or a nitrogen group-containing compound; and carbon black particles blended with the polymer, with at least 10 percent by weight of the carbon black being oxidized, the functionalized sites at the terminal portions of the polymer molecules interacting with the oxidized sites on the carbon black to increase affinity between the carbon black and the polymer to reduce hysteresis.

18. The composition of claim 17, wherein the polymer molecules are anionically initiated with a triorgano substituted-tin lithium compound or an initiator formed by reacting an organolithium compound with a nitrogen-containing functionalizing agent.

19. The composition of claim 17, wherein said terminal compound is an N,N-dialkyl-aminoaldehyde, N,N-dialkyl-aminoketone, N,N-dialkyl-aminothioaldehyde, N,N-dialkyl-aminothioketone, N,N-dialkyl-amide, N,N-dialkylthioamide, alkyl imine, N,N-dialkyl-amine substituted thiobenzophenone, carbodiimide, carbamide or N,N,N',N'-tetra alkyl urea derivative, N,N-dialkyl-aryl amine, N,N-dialkyl-aliphatic amine, N,N'-disubstituted cyclic urea, N-substituted cyclic amide, or a mono-, di or polyisocyanate.

20. The composition of claim 17, wherein said terminal compound has the formula:

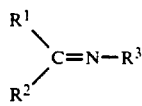

wherein $R^1$ and $R^2$ are selected from the group consisting of hydrogen, alkyl, cycloalkyl, aryl, dialkylaminoaryl, aralkyl, and aprotic O, N and S-containing alkyl, cycloalkyl, aryl, and aralkyl groups; wherein $R^3$ is selected from the group consisting of alkyl, cycloalkyl, aryl, dialkylaminoaryl, aralkyl, and aprotic O, N and S-containing alkyl, cycloalkyl, aryl and aralkyl groups;
  with the proviso that at least one of the $R^1$, $R^2$, and $R^3$ groups must be a dialkylaminoaryl group and that not all of the $R^1$, $R^2$, and $R^3$ groups can be aryl groups, and wherein $R^1$, $R^2$, and $R^3$, independently have from 1 to 20 carbon atoms.

21. The composition of claim 17, wherein said terminal compound is a dialkylaminobenzylidene alkylamine, a dialkylaminobenzylidene aniline, a dialkylaminobenzylidene alkoxyaniline, a dialkylamino benzylidene dialkylaminoaniline, a benzylidene dialkylaminoaniline, an alkoxybenzylidene dialkylaminoaniline or an α,α-dialkylalkylidene dialkylaminoanilines.

22. The composition of claim 17, wherein said terminal compound is 4,4'-bis(dimethylamino)benzophenone, 4-dimethylaminobenzaldehyde, N-methyl pyrolidinone, 1,3-dimethyl-2-imidazolidinone, dicyclohexlcarbodiimide, diphenylcarbodiimide, or diphenyl cyanamide.

23. The composition of claim 17, wherein said terminal compound is a triorgano substituted tin halide having the formula

wherein a is zero or an integer in the range 1 to 3, x is a chlorine or bromine atom, and R is an alkyl having 1 to about 20 carbon atoms, an aryl having from 6 to about 20 carbon atoms, or an aralkyl having from about 7 to about 20 carbon atoms, and wherein X is a halide.

24. A composition adapted for use in forming a tread and/or sidewall portion of a tire having reduced rolling resistance, comprising an elastomeric polymer polymerized from at least one diene monomer or at least one diene monomer and at least one vinyl substituted aromatic monomer, the polymer molecules being anionically initiated, at least 10 percent of the terminals of said polymer molecules being functionalized by reaction with a tin group- or a nitrogen group-containing compound, said polymer molecules having a number average molecular weight of from about 100,000 to about 200,000; and carbon black particles blended with said polymer, at least 10 percent by weight of said carbon black being oxidized, said oxidized carbon black having an acid content of at least 0.1 milliequivalents per gram and a volatile content of at least 2 percent by weight, the functionalized sites at the terminal portions of the polymer molecules interacting with the oxidized sites on the carbon black to increase affinity between the carbon black and the polymer to reduce hysteresis.

* * * * *